(12) United States Patent
Banguero et al.

(10) Patent No.: US 8,713,571 B2
(45) Date of Patent: Apr. 29, 2014

(54) ASYNCHRONOUS TASK EXECUTION

(75) Inventors: Edgar A. Banguero, Newcastle, WA (US); Eric J. Holton, Shoreline, WA (US); Brian M. Perrin, Redmond, WA (US); Daniel W. Crevier, Bellevue, WA (US); Jose Emmanuel Miranda Steiner, Redmond, WA (US); Jeffrey E. Steinbok, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1025 days.

(21) Appl. No.: 12/706,931

(22) Filed: Feb. 17, 2010

(65) Prior Publication Data

US 2011/0202924 A1 Aug. 18, 2011

(51) Int. Cl.
*G06F 9/46* (2006.01)

(52) U.S. Cl.
USPC ............ 718/103; 718/102; 718/105; 718/107

(58) Field of Classification Search
None
See application file for complete search history.

(56) References Cited

U.S. PATENT DOCUMENTS

| | | | | |
|---|---|---|---|---|
| 6,205,150 | B1* | 3/2001 | Ruszczyk ............... | 370/412 |
| 6,904,483 | B2* | 6/2005 | Koning et al. ............ | 710/244 |
| 7,774,750 | B2* | 8/2010 | Chrysanthakopoulos .... | 717/119 |
| 2003/0088677 | A1* | 5/2003 | Yamamoto ............... | 709/227 |
| 2005/0240924 | A1* | 10/2005 | Jones et al. ............ | 718/100 |
| 2006/0248207 | A1* | 11/2006 | Olson et al. ............ | 709/230 |
| 2008/0295119 | A1 | 11/2008 | Muscarella | |
| 2009/0271693 | A1 | 10/2009 | Rae et al. | |
| 2010/0211959 | A1* | 8/2010 | Chan et al. ............ | 718/107 |

OTHER PUBLICATIONS

Strahl, Rick, "Handling Long Web Requests with Asynchronous Request Processing", Retrieved at code-magazine.com/article.aspx?quickid=0102091&page=1>>, 2001, pp. 3.
Hanson, Jeff, "Create an Asynchronous Message Framework with Ajax and Apache Geronimo", Retrieved at ibm.com/developerworks/opensource/library/os-ag-asynchajax/index.html>>, Jun. 19, 2007, pp. 12.
Bromberg, Peter A., "Asynchronous ASP.NET Page Processing", Retrieved at eggheadcafe.com/articles/20060918.asp>>, Jan. 21, 2010, pp. 3.
"Communicate with a Server", Retrieved at code.google.com/webtoolkit/doc/latest/DevGuideServerCommunication.html#DevGuideGettingUsedToAsyncCalls>>, Jan. 21, 2010, pp. 27.
Hacigumus, et al., "Optimal Asynchronous Service Scheduling in Bison", Retrieved at almaden.ibm.com/asr/projects/biw/publications/bison_ajax.pdf>>, Proceedings of the IEEE International Conference on Services Computing, Sep. 18-22, 2006, pp. 3.
Adams, Holt, "Asynchronous Operations and Web Services, Part 1: A primer on Asynchronous Transactions", Retrieved at ibm.com/developerworks/library/ws-asynch1.html>>, Apr. 1, 2002, pp. 5.

* cited by examiner

*Primary Examiner* — Meng An
*Assistant Examiner* — Wissam Rashid
(74) *Attorney, Agent, or Firm* — Bryan Webster; Andrew Sanders; Micky Minhas

(57) ABSTRACT

Techniques for asynchronous task execution are described. In an implementation, tasks may be initiated and executed asynchronously, thereby allowing a plurality of calls to be made in parallel. Each task may be associated with a respective timeout that triggers an end to execution of the task. If a timeout for a low priority task expires without completing both the low priority task and a relatively higher priority task, then the low priority task may use the relatively higher priority task to extend execution time of the low priority task in order to allow additional time to perform the low priority task.

17 Claims, 7 Drawing Sheets

ASYNCHRONOUS TASK EXECUTION

BACKGROUND

Computing systems typically have many tasks to perform, even thousands of tasks, and each task may have many subtasks. Management of such a high number of tasks may be difficult using traditional techniques. One example use of tasks can be to load web pages. However, an ever increasing amount of content continues to be designed and implemented into web pages placing an increasingly heavier burden on servers to provide these web pages. Thus, this burden may increase the amount of time that it takes to receive and render web pages at a client, which may result in a poor user experience.

SUMMARY

Techniques for asynchronous task execution are described. In an implementation, tasks may be initiated and executed asynchronously, thereby allowing a plurality of calls to be made in parallel. Each task may be associated with a respective timeout that triggers an end to execution of the task. If a timeout for a low priority task expires without completing both the low priority task and a relatively higher priority task, then the low priority task may use the relatively higher priority task to extend execution time of the low priority task in order to allow additional time to perform the low priority task.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Figure 1:
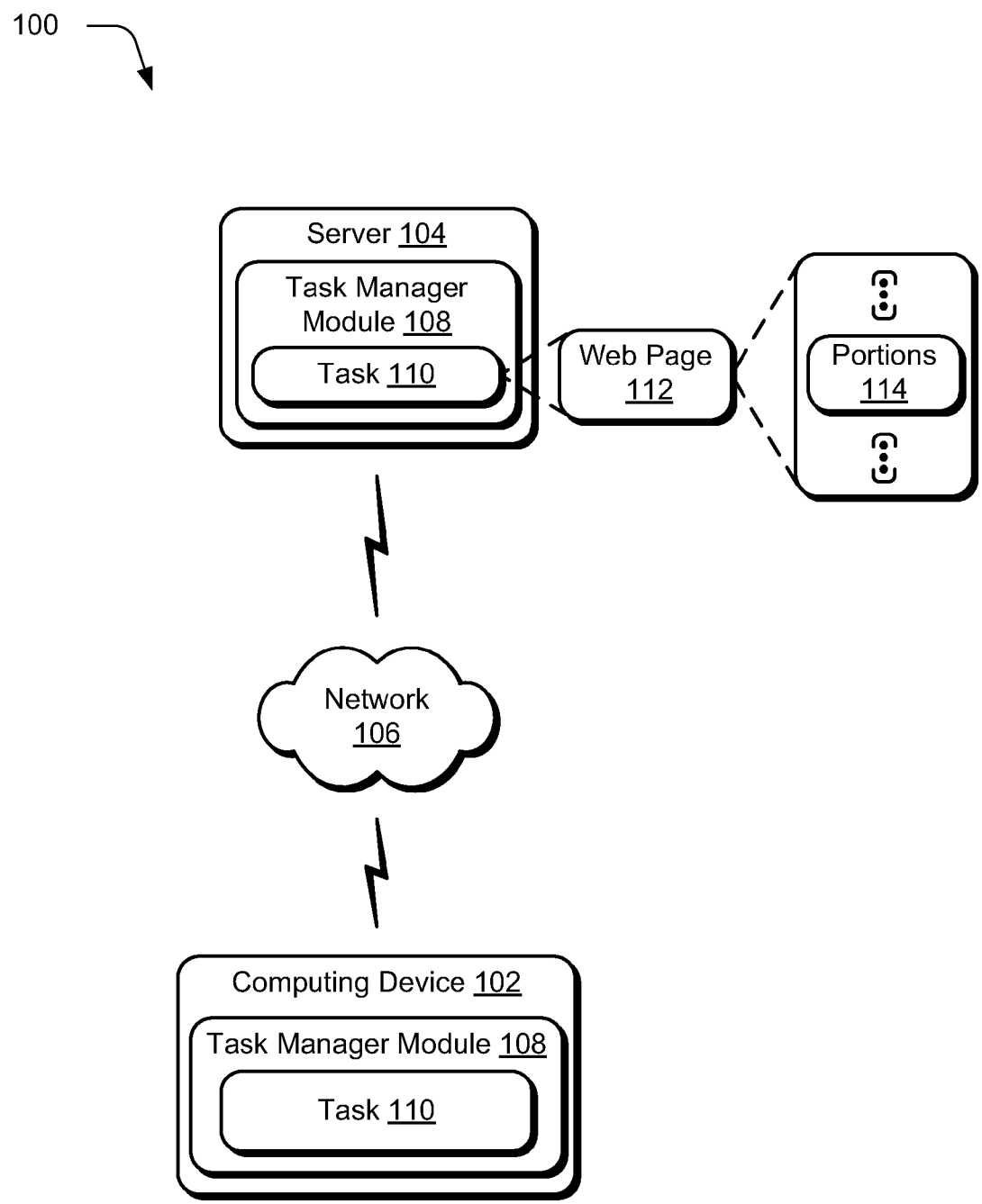
FIG. 1 is an illustration of an environment in an example implementation that is operable to provide asynchronous task execution.

Web page loads may involve several backend service calls. Typically, as the amount of content that is included on these web pages increases, so too does the number of calls made to the backend service. Further, the increased number of backend service calls generally increase the amount of time used to fetch portions of the web page for rendering. Traditional techniques that were employed to address these challenges were difficult and time consuming. For example, a backend service call may depend on other calls that may be distributed through the code, and therefore difficult to order and resolve using traditional techniques.

Asynchronous task techniques are described. In an implementation, tasks may be initiated and executed asynchronously, thereby allowing a plurality of calls to be made in parallel and which may reduce the overall time it takes to perform the tasks, such as to render a page. For example, a task may be implemented as a class that exposes a Begin, an End, and Timeout callbacks, which when executed, are used to perform an operation. A task may be used, for instance, to load or render a page, or a portion of a page, on a display device. The page may be a document, web page, or any other suitable graphical user interface displayed on a display device. For example a task may be used to load a calendar or mail in an email application. Another example use of a task may be to process messages between applications, computing devices, and/or servers. Additionally, a task may be used to perform a process or one or more steps in a process such as, for example, sending a request from a client to a server for a portion of a web page, receiving a response from the server, and rendering that portion of the web page at the client. In one implementation, the task may be some computation or process that executes until an associated timeout expires. The timeout associated with the task may trigger an end to execution of the task when the timeout expires. A timeout may also be associated with a set of tasks and may trigger an end to execution of the set of tasks when the timeout expires.

In one embodiment, a timeout that is specified for the task can be extended to allow additional time to perform the task. For example, assume that a lower priority task is associated with a timeout that is shorter than a timeout for a higher priority task that is executing in parallel with the lower priority task. If the timeout for the lower priority task expires without completing both the lower priority task and the higher priority task, then the timeout of the lower priority task may be extended to allow additional time to perform the lower priority task. This extension of the timeout may be until completion of the higher priority task or until expiration of the timeout associated with the higher priority task. By extending timeouts of lower priority tasks in this manner, the additional time it takes to perform the higher priority task may be utilized such that additional callbacks to the backend service due to incomplete lower priority tasks may be prevented, which may reduce the overall time it takes to perform the tasks.

In the discussion that follows, a section entitled "Example Environment" describes an example environment and devices, which may be employed to provide a framework that enables dependent and independent asynchronous calls to backend services. Following this, a section entitled "Example Procedures" describes example techniques related to the framework in accordance with one or more embodiments. Last, a section entitled "Example Devices" is provided and describes example devices that can be used to implement one or more embodiments of techniques for a framework that enables dependent and independent asynchronous calls to backend services.

Example Environment

FIG. 1 is an illustration of the example environment 100 that is operable to provide asynchronous task execution. The illustrated environment includes one or more computing devices 102, and one or more servers 104 that are communicatively coupled, one to another, over a network 106. The network 106 may assume a wide variety of configurations. For example, the network 106 may include a wide area network (WAN), a local area network (LAN), a wireless network, a public telephone network, an intranet, an Internet, and so forth. Further, although a single network 106 is shown, the network 106 may be configured to include multiple networks.

Asynchronous task execution may be performed across a distributed environment or within a single computing device. Accordingly, for the purposes of the following discussion, a reference component, such as server 104, may refer to one or more entities, and therefore by convention reference may be made to a single entity (e.g., the server 104) or multiple entities (e.g., the servers 104, the plurality of servers 104, and so on) using the same reference number.

The computing device 102 may be configured in a variety of ways. For example, the computing device 102 may be configured as a computer that is capable of communicating over the network 106, such as a desktop computer, a mobile station, an entertainment appliance, a set-top box communicatively coupled to a display device, a wireless phone, and so forth.

The computing device 102 may have one or more task manager modules 108. The task manager modules 108 are representative of functionality to manage one or more tasks 110. The task manager module 108 may operate solely on the computing device 102 or may operate in a distributed environment with one or more computing devices 102 or servers 104 across the network 106. An example of this is shown in FIG. 1 through use of the same reference number for both task manager modules 108 at the computing device 102 and at the server 104. It should be readily apparent, however, that other distribution and/or local execution arrangements are also contemplated.

A task 110 managed by the task manager module 108 can be used to provide a wide variety of functionality. For example, the task 110 can be an operation or set of operations that define a process or a part of a process. Alternately or additionally, a task 110 can be a set of program instructions that are loaded in memory and may be treated by an application as an element of work to be accomplished by the computing device 102. In one implementation, a task 110 can perform an operation, such as providing a web page 112 or a portion 114 of the web page. Further, the task 110 can be a call, a series of calls, or an array of calls to a server 104 or computing device 102.

Additionally, the tasks 110 can have associated priorities. For example, the priorities can be organized in a simple hierarchy that includes high, medium, and low. In another example, prioritization of tasks 110 can be more complex than the simple hierarchy by including any number of priority levels with any number of tasks 110 included at each level. Priorities may be used in association with an amount of time that is allotted to perform each task 110. For instance, a task with a high priority may be allowed more time in which to execute than a different task with a relatively lower priority. Alternately or additionally, priorities can be associated with a set of tasks as well as each individual task in the set of tasks.

Figure 2:
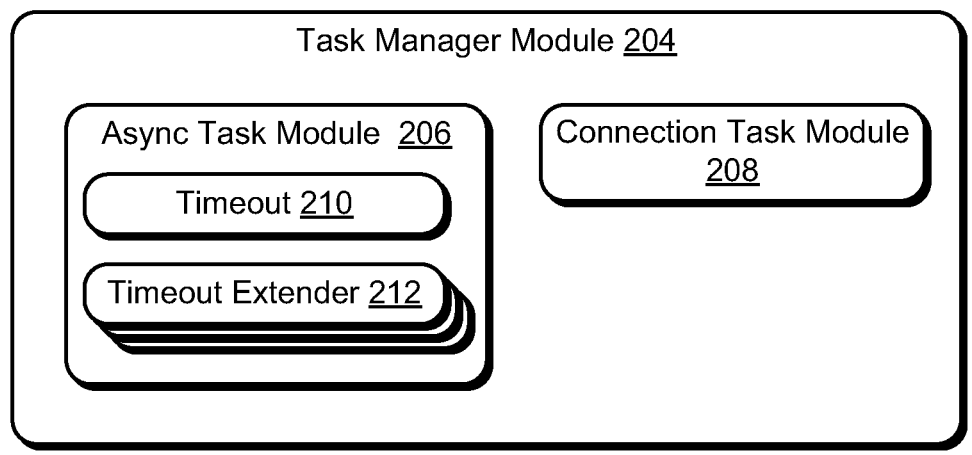
FIG. 2 is an illustration of an example task manager module in accordance with one or more embodiments.

Consider now FIG. 2, which is an illustration of an example task manager module 204 in accordance with one or more embodiments. The task manager module 204 can manage one or more task modules such as, for instance, an async task module 206 and/or a connection task module 208. In an implementation, the async task module 206 manages one or more asynchronous tasks that do not have inherent dependencies. Additionally, the async task module 206 can be associated with a timeout 210 and/or one or more timeout extenders 212.

When a set of concurrent asynchronous tasks is insufficient, the connection task module 208 can be utilized to allow more complicated logic to pass data between tasks and delay execution until dependencies are completed. For example, the connection task module 208 may contain page-specific logic that occurs during data load. As such, the connection task module 208 can be tied to a specific page or a set of similar pages. However, the connection task module 208 may contain logic that is not specific to a particular page, but is instead generally applicable to any page. Therefore, the connection task module 208 is representative of functionality in this embodiment to handle task dependencies, and thereby allow the results from one or more tasks to be fed into other tasks.

One example of resolving task dependencies by using the connection task is as follows. For instance, assume that tasks A, B, and C are to be initiated asynchronously and task C is dependent on task A. In this example, tasks A and B may be initiated and executed in parallel while execution of task C may be delayed until task A is complete. Once task A has completed, then task C may be initiated. When dependencies, such as task C in this example, are distributed through the code, implementation of serial execution in combination with asynchronous execution may provide a substantial improvement over traditional techniques when coordinating execution of multiple tasks.

Each task managed by the async task module 206 can be associated with a timeout 210. The timeout 210 can specify an amount of time that a task is allowed in order to perform the task and can also trigger an end to execution of the task. The amount of time in the timeout 210 can be relative to the associated task. For example, the timeout 210 may begin just before a Begin method is called instead of when the task is created or when processing of the task begins. Additionally, the task may complete before expiration of the timeout 210 or the task may prematurely end when the timeout 210 expires. In the case that the task fails to complete before expiration of the timeout 210, the timeout 210 can be considered a task failure. Timeouts 210 can also be used in conjunction with the priorities described above. For instance, a task with a high priority may have a longer timeout than a task with a low priority. In other words, the high priority task may be allowed more time to execute than the low priority task due to a difference in timeouts.

Additionally or alternately, a task can use a relatively higher priority task as a timeout extender 212 in order to extend the amount of time that the task is allowed to execute. Consider an example set of tasks for loading a page using the following table:

TABLE 1

| Task | Timeout (ms) |
|---|---|
| FindAllComponents | 1200 |
| Mail | 700 |
| Calendar | 700 |
| WhatsNew (GetWhatsNew followed by LoadIdentityProfiles) | 700 |
| OfficeLive | 700 |
| FriendInvites | 700 |

In this example, the tasks in Table 1 may be executed in parallel. Each task has an associated timeout that determines the amount of time in milliseconds (ms) allowed for execution. FindAllComponents is used in this example to return Private Messages, Home Settings, Modules Layout, Theme, PSM, Photos, and so on, and is thus given a higher priority than the other calls. Because of this, FindAllComponents is provided the most amount of time to execute (e.g., 1200 ms) when compared with the other tasks. The other tasks in Table 1 are given lower priorities in this example than FindAllComponents and thus have shorter timeouts (e.g., 700 ms). Shorter timeouts may be specified to avoid delays in rendering of the page because one or more of these tasks has taken "too long" to complete. Because FindAllComponents has the longest timeout and has a relatively highest priority, this call may also be used to determine an effective timeout for the entire page.

For example, one or more of the tasks Mail, Calendar, WhatsNew, OfficeLive, and FriendInvites may use FindAllComponents as a timeout extender. By using FindAllComponents as a timeout extender, Mail, for example, can utilize extra time beyond 700 ms to continue execution if desired and if FindAllComponents has not completed execution. In this case, Mail can thus use as much time as FindAllComponents uses, up to 1200 ms, unless FindAllComponents completes before then. For example, if FindAllComponents completes in 900 ms, then Mail will be limited to the same 900 ms. Accordingly, the lower priority tasks (e.g., Mail, Calendar, WhatsNew, OfficeLive, and FriendInvites) may be limited to the amount of time of the higher priority task (e.g., 1200 ms of the timeout extending task FindAllComponents) or the amount of time it takes to complete the higher priority task (e.g., FindAllComponents).

If, however, FindAllComponents completes in 500 ms, which is less than the timeout of the lower priority tasks, then the lower priority tasks may not be terminated prematurely, but may still have 700 ms for execution. In other words, if the higher priority task completes before expiration of a lower priority task's timeout and before the lower priority task completes, the lower priority task may continue execution until the lower priority task's timeout expires instead of ending prematurely. However, in such an example, the lower priority task may not be able to extend the amount of time for execution since the timeout extender has already completed.

If instead no timeout extenders are utilized, then the following may occur. Using Table 1, assume, for example, that for a page request, FindAllComponents takes 1100 ms to complete and OfficeLive task needs 750 ms to complete. The default timeout for the OfficeLive task in this example is 700 ms, as shown in Table 1, but with no timeout extender, OfficeLive cannot take advantage of the additional time that FindAllComponents is using. Therefore, at 700 ms, the timeout for OfficeLive triggers and OfficeLive renders at a client. This may cause the client to call the server again, this time with a longer timeout, to get all the data. Such additional calls, however, may be avoided by using timeout extenders. For example, the OfficeLive task may have used FindAllComponents as a timeout extender and thus OfficeLive would have been afforded up to 1100 ms to complete, and no additional call to the server would be needed.

Figure 3:
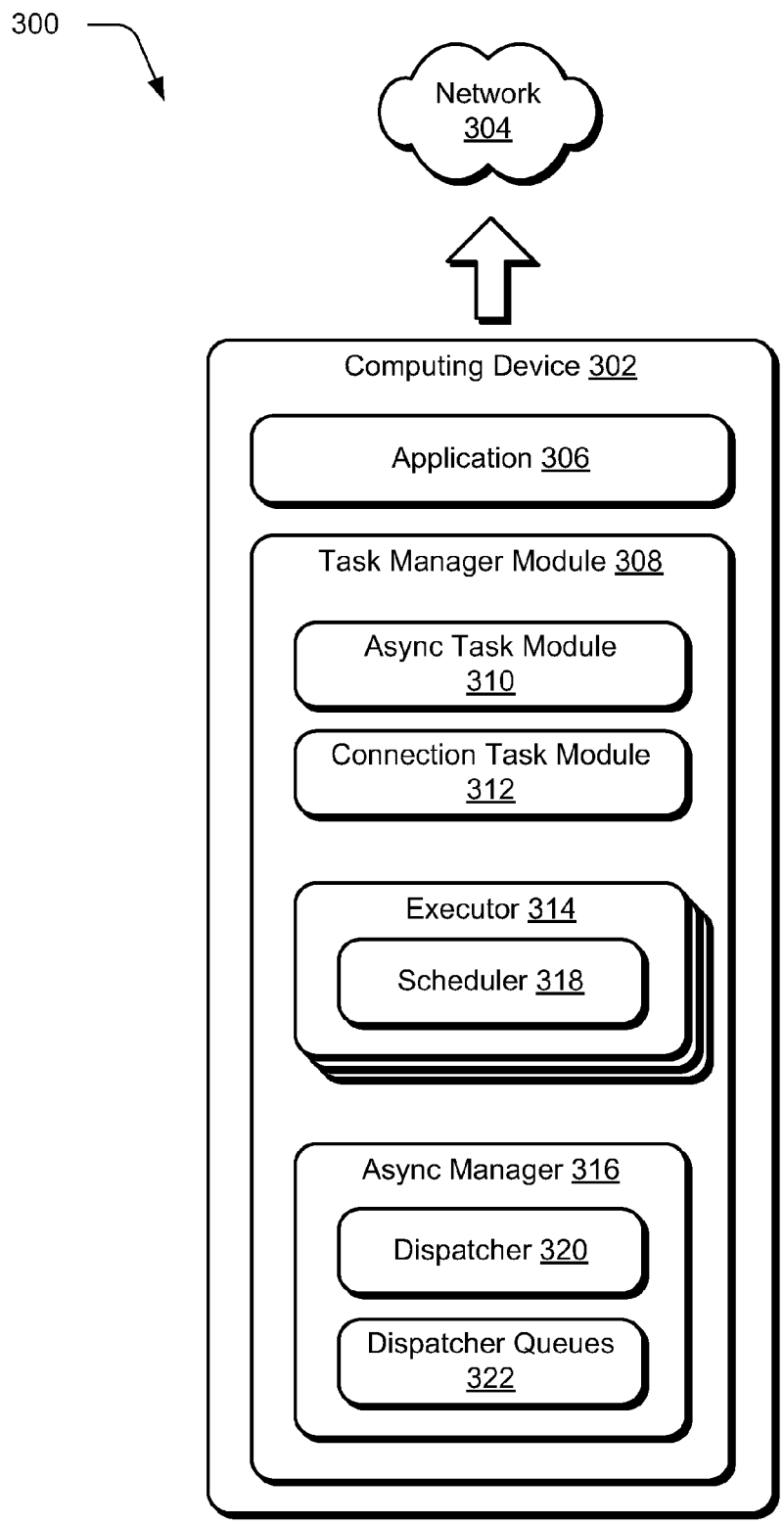
FIG. 3 is an illustration of an example computing device in an example implementation that is operable to provide asynchronous task execution.

Having described the task manager module 204 and associated components in relation to FIG. 2, consider an example environment 300, in FIG. 3, that includes an example computing device 302.

FIG. 3 is an illustration of an example environment 300 in an example implementation that is operable to provide asynchronous task execution. A computing device 302 is shown that is capable of communication over a network 304. The computing device 302 includes an application 306 that can communicate with a task manager module 308. Although these are shown separately but within the same computing device, the application 306 and the task manager module 308 can reside on the same component, on different components, or on different computing devices communicatively coupled over the network 304. Additionally or alternately, although the application 306 and the task manager module 308 are shown separately, the task manager module 308 may operate within the application 306 or independent of the application 306. The task manager module 308 may have an async task module 310, a connection task module 312, an executor 314, and an async manager 316. The executor 314 can manage a scheduler 318, while the async manager 316 can manage a dispatcher 320 and dispatcher queues 322.

The executor 314 is a module that is configured to allow execution of tasks and then perform a callback when a timeout associated with the executor 314 expires or each of the tasks in a set of tasks complete. Responsive to a request for the execution of the tasks, the executor 314 can implement a scheduler 318 that uses one or more dispatcher queues 322 to schedule the tasks. Each dispatcher queue 322 may contain a policy for throttling task execution. This can enable an application to handle large task loads by allocating the management of large queues to the scheduler 318. In addition, a dispatcher queue 322 may be configured in a variety of ways, such as a first in first out (FIFO) queue of tasks. Alternately or additionally, a dispatcher queue 318 may be configured to use a thread pool for scheduling tasks or an instance of a dispatcher 316.

The dispatcher 320 is representative of functionality to manage operating system threads and to load balance tasks scheduled by the scheduler 318. The dispatcher 320 may use one thread or multiple threads when balancing the load of tasks. For example, assume that two queues, queue1 and queue2, are associated with one dispatcher 320 and queue1 has 1000 queued tasks while queue2 has only one queued task. Traditional techniques did not provide a mechanism for a new task to be processed by queue1 until each of the 1000 tasks had been extracted from the thread pool's queue. However, using embodiments described herein, the dispatcher 320 can pick one task from each queue, e.g., in a "round robin" fashion. Additionally or alternatively, one queue can be used for most tasks (e.g., lower priority tasks) while the other queue can be used for relatively higher priority tasks. A variety of other examples are also contemplated.

Having considered example devices and components of an example environment, consider now example procedures of asynchronous task execution that may be implemented in the environment using the example components, as well as in other environments.

Example Procedures

The following discussion describes techniques for asynchronous task execution that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1 and/or the example task manager module 204 of FIG. 2.

Figure 4:
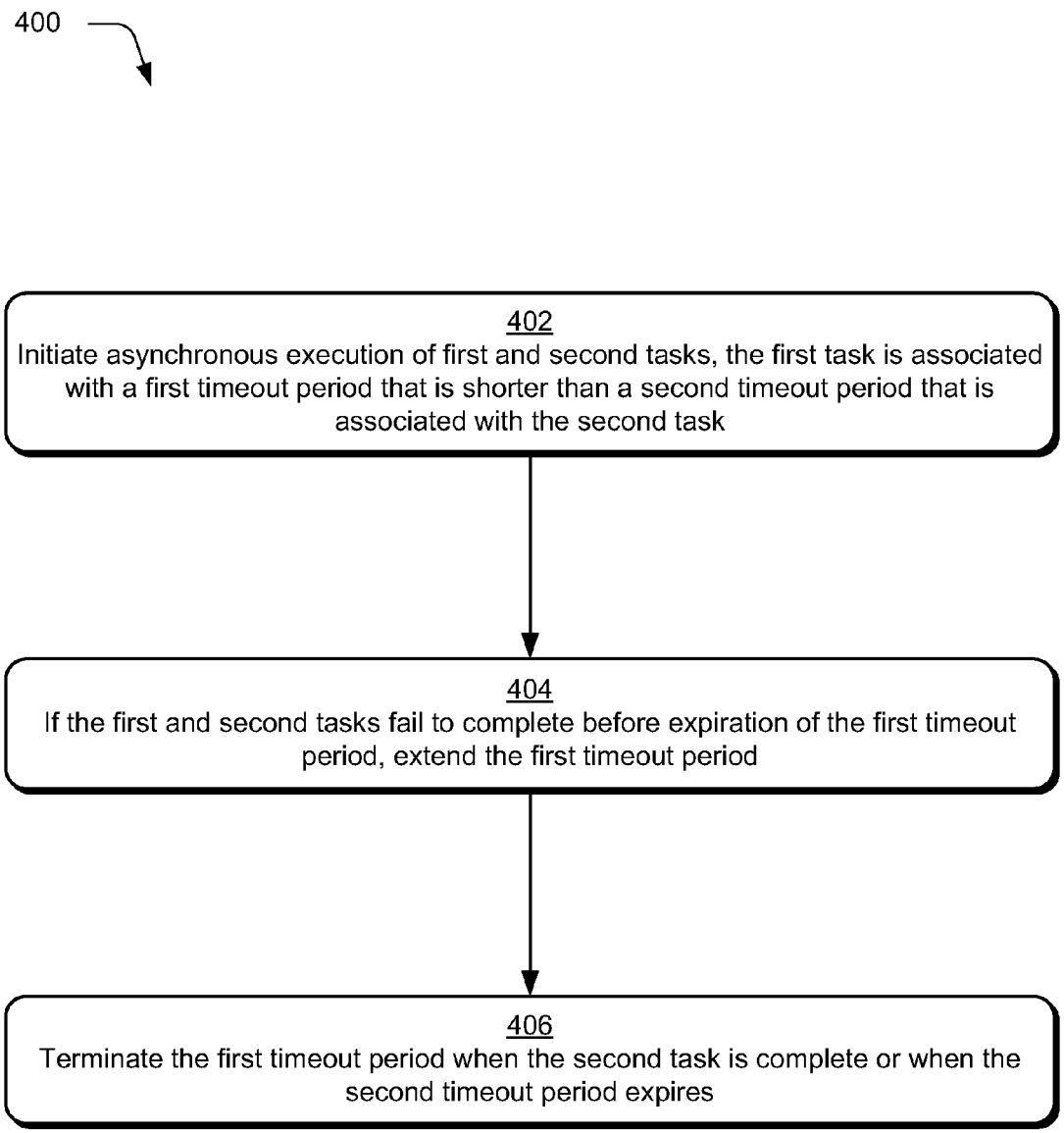
FIG. 4 is a flow diagram depicting a procedure in an example implementation in which asynchronous task execution occurs.

FIG. 4 depicts a procedure 400 in an example implementation in which asynchronous task execution occurs. In at least some embodiments, procedure 400 may be performed by a suitably configured computing device such as computing device 102 of FIG. 1 having a task manager module 108, or by a server 104, or by server 104 and computing device 102 in combination, and so on.

Asynchronous execution of multiple tasks is initiated (block 402). For example, a request to load a webpage 112 in FIG. 1 may include first and second tasks. Both the first task and the second task may have associated timeouts (e.g., a first timeout and a second timeout, respectively) that determine the amount of time allowed for each task to execute. In one implementation, the first timeout may be shorter than the second timeout. This may be, for example, because the first task has a relatively lower priority than a priority associated with the second task, or because the first task is relatively simpler than the second task and can thus complete in a lesser amount of time, and so on.

If the first timeout expires before both the first and second tasks complete, then the first timeout is extended (block 404). The first timeout may be extended in a variety of ways. For example, the first task may use the second task as a timeout extender. This will allow the first task to continue executing even though the first timeout is expired, but not past completion of the second task or expiration of the second timeout (block 406). Consider, for example, that the first timeout specifies 700 ms of time to execute the first task while the second timeout specifies 1200 ms of time to execute the second task. If both the first and second tasks fail to complete before 700 ms, then the first task may continue executing up to 1200 ms, unless the second task completes before then. For example, if the second task completes at 900 ms but the first task is still executing, the first task will also end at 900 ms because the first task's timeout extender, which is the second task, completed.

Figure 5:
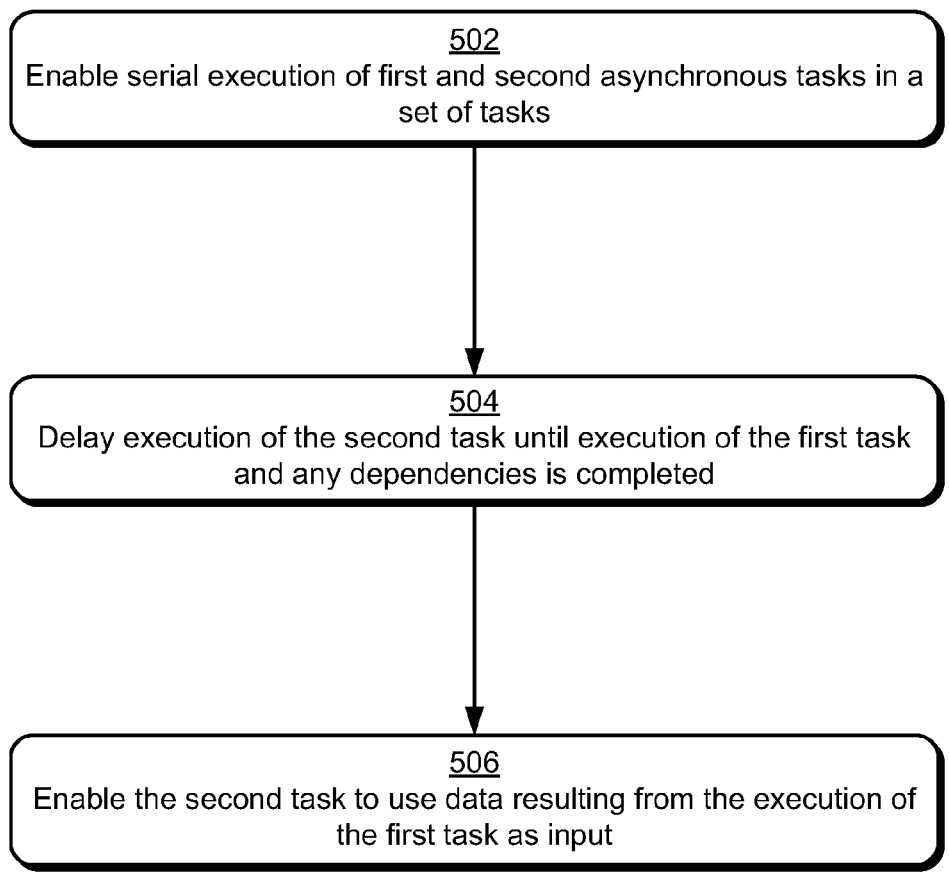
FIG. 5 is a flow diagram depicting a procedure in an example implementation in which serial execution of asynchronous tasks occurs.

Having considered an example procedure using a timeout extender, consider now a procedure 500 in FIG. 5 that depicts an example implementation in which serial execution of asynchronous tasks occurs. In at least some embodiments, procedure 500 may be performed by a suitably configured computing device such as computing device 102 of FIG. 1 having a task manager module 108, or by a server 104, or by server 104 and computing device 102 in combination, and so on. Additionally, procedure 500 may be performed by a connection task module 208 in FIG. 2.

Serial execution of two or more asynchronous tasks in a set of tasks is enabled (block 502). This may involve delaying execution of one task until execution of another task and dependencies of the other task is completed (block 504). Continuing the example described above in Table 1, the WhatsNew task is illustrated as a connection task by the parenthetical "(GetWhatsNew followed by LoadIdentityProfiles)". This WhatsNew task internally schedules the GetWhatsNew task but delays execution of the LoadIdentityProfiles task. When the GetWhatsNew task is complete, the WhatsNew task then schedules and waits for the LoadIdentityProfiles task to complete. This may enable the LoadIdentityProfiles task to use data resulting from the GetWhatsNew task as input (block 506).

Figure 6:
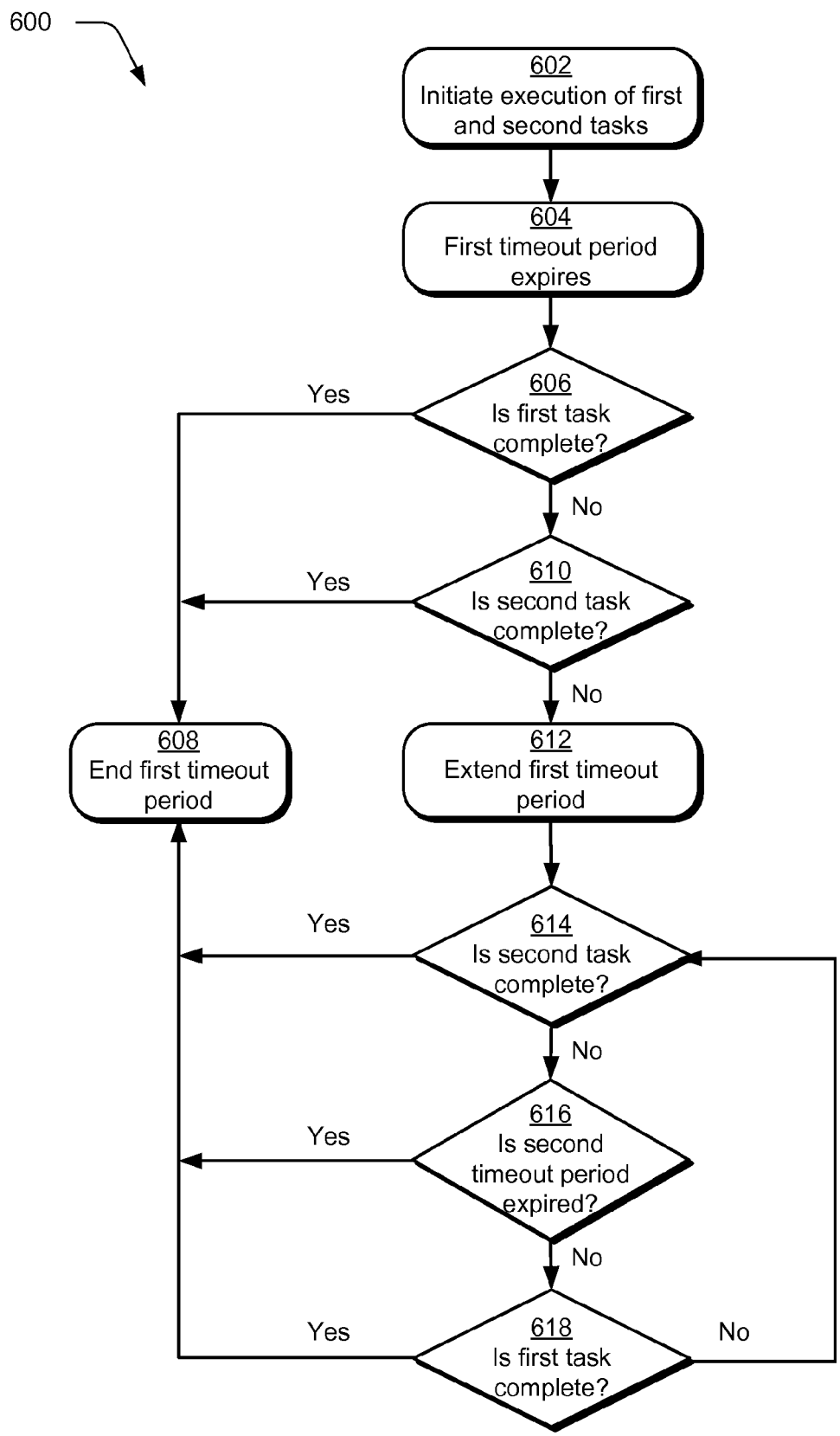
FIG. 6 is a flow diagram that depicts an illustrative example of timeout extensions in accordance with one or more embodiments.

Consider now FIG. 6, which is a flow diagram of a procedure 600 depicting an illustrative example of using timeout extensions in accordance with one or more embodiments. Procedure 600 illustrates a variety of scenarios that may occur when using timeout extensions. For simplicity of discussion, procedure 600 is shown using first and second tasks. However, any number of tasks and/or sets of tasks may be utilized. The process may begin when execution of first and second tasks is initiated (block 602). Each of the first and second tasks is associated with a timeout (e.g., first and second timeouts, respectively). In this example, the second task has a relatively higher priority than that of the first task, and therefore in this instance the second timeout is longer than the first timeout. Additionally, the first task in this example uses the second task as a timeout extender.

At block 604, the first timeout expires after a specified amount of time. When the first timeout expires, then a determination may be made as to whether the first task is complete (decision block 606). If the first task is complete ("yes" from decision block 606), then the first timeout is not extended and the first timeout is ended (block 608). If, however, the first task is not complete ("no" from decision block 606), then a determination is made as to whether the second task is complete (decision block 610). If the second task, which is used in this example as the timeout extender of the first task, is completed ("yes" from decision block 610), then the first timeout is ended (block 608). In contrast, if the second task is not complete ("no" from decision block 610), then the first timeout may be extended to allow more time to execute the first task and thereby utilize at least some of the extra time being used for execution of the second task (block 612).

Because the second task in this example is being used as the timeout extender for the first task, the process 600 may now shift to an evaluation of the second task and the second timeout that is associated with the second task, beginning at decision block 614. If at any time the second task completes ("yes" from decision block 614), then the extension of the first timeout will end and thereby trigger an end to the execution of the first task (block 608). On the other hand, if the second task is not complete ("no" from decision block 614), then a determination is made as to whether the second timeout is expired (decision block 616). If the second timeout is expired ("yes" from decision block 616), the extension of the first timeout is ended (block 608). Alternatively, if the second timeout is not expired ("no" from decision block 616), then the process determines whether the first task is complete (decision block 618). If the first task is complete ("yes" from decision block 618), then the execution of the first task is no longer extended and the extension of the first timeout is ended (block 608). Conversely, if the first task is not complete ("no" from decision block 618), then the process will reevaluate whether the second task is complete (decision block 614), whether the second timeout is expired (decision block 616), or whether the first task is complete (decision block 618). Once any one of these conditions is satisfied, then the extension of the first timeout is ended (block 608), thereby triggering an end to the execution of the first task.

Having considered various example procedures related to asynchronous task execution, consider now example implementations of devices, modules, and tasks that may be employed to provide techniques for asynchronous task execution in one or more embodiments.

Example Device

The following discussion will describe various embodiments and sample implementations of different modules employed to provide techniques for asynchronous task execution. These modules may be implemented in any suitable way, and the following description is for illustrative, not limiting, purposes. In portions of the following discussion, reference may be made to the example task manager module 204 of FIG. 2 and/or the example environment 300 of FIG. 3.

The async task module 206 of FIG. 2 may be an abstract base class that represents a basic asynchronous task, with no inherent dependencies. To implement the async task module 206, a subclass may be created to expose the following abstract methods:

```
public abstract class AsyncTask : BaseTask
{
    public bool AddTimeoutExtender(BaseTask extender);
    protected abstract IAsyncResult BeginTask(AsyncCallback callback);
    protected abstract void EndTask(IAsyncResult result);
    protected virtual void TimeoutTask(IAsyncResult result);
    public TimeSpan? Timeout { get; }
    public bool HasSucceeded { get; }
    public bool HasTimedOut { get; }
    public bool IsExecuting { get; }
    public Exception Error { get; }
    public TimeSpan ElapsedTime { get; }
    protected abstract ImfResultTimingEvent ResultTimingEvent { get; }
}
```

The connection task module 208 of FIG. 2 may be implemented by the following API definition of public constructors, methods, and properties of the connection task module 208:

```
public abstract class ConnectionTask : BaseTask
{
    public void AddTimeoutExtender(BaseTask extender);
    protected abstract IEnumerable<BaseTask> DoTask( );
    public TaskScheduler TaskScheduler { get; }
    protected virtual void TimeoutTask(BaseTask task);
    public virtual TimeSpan? Timeout { get; set; }
    public bool HasSucceeded { get; }
    public bool HasTimedOut { get; }
    public bool IsExecuting { get; }
    public Exception Error { get; }
    public TimeSpan ElapsedTime { get; }
    protected virtual ImfResultTimingEvent ResultTimingEvent { get; }
}
```

In the above API definition of the connection task module 208, the method "protected abstract IEnumerable<BaseTask>DoTask( )" returns an IEnumerable of BaseTask, and each task returned in the enumeration may be allowed to complete before DoTask can continue. In an implementation, the system will not attempt to identify circular dependencies (e.g. a connection task module yielding itself during DoTask); such situations will be allowed to "hang" until the timeout expires. In an example, the DoTask method is called unless the executor 310 of FIG. 3 times out before the DoTask is scheduled on the scheduler 314 of FIG. 3.

Additionally, in the above API definition of the connection task module 208, the TaskScheduler property (e.g., public TaskScheduler TaskScheduler {get;}) on the task exposes the asynchronous scheduler after the task is scheduled. This may allow the connection task module 208 to schedule additional tasks during its DoTask method. In one example, this property may be null prior to being scheduled (e.g., during a constructor), as shown in the following API:

```
public interface ITaskScheduler
{
    void ScheduleTask(BaseTask task);
    void ScheduleTask(BaseTask task, TaskPriority priority);
    void ScheduleTask(BaseTask task, string customQueueName);
    bool HasTimedOut { get; }
}
```

The executor 310 in FIG. 3 may be defined by the following sample API:

```
public delegate void ExecutorCallBack(Exception ex, bool hasTimedout,
TimeSpan executionTime, TaskStats[ ] taskStats);
public class TaskExecutor
{
    public TaskExecutor(AsyncManager asyncManager, TimeSpan timeout,
ExecutorCallBack
                    callback, params TaskQueueItem[ ] items)
    {
        //Create a taskScheduler instance
    }
    private class TaskScheduler : ITaskScheduler
    {
        //Implement ITaskScheduler
        //Internally, this interacts with Ccr and keeps a pendingTasksCount
        //When a task is scheduled, sets its TaskScheduler property to this
TaskScheduler
        //instance so that they schedule more tasks
        //calls the ExecutorCallBack when pendingTasksCount reaches 0, or
the TaskExecutor
        //times out
    }
}
```

Here, the initial set of tasks may be passed to the TaskExecutor constructor in the TaskQueueItem[ ] that contains information about the task(s) that are to be scheduled. Once a task is scheduled, the TaskScheduler property is set to allow more tasks to be scheduled if desired. When all the tasks complete or the TaskExecutor times out, the ExecutorCallBack will be invoked to enable execution to resume and to allow verification of the TaskStats[ ], which may provide status and duration information about each task.

Having considered some example implementations of various modules for performing asynchronous task execution, consider now example implementations of devices, modules, and user interfaces that may be employed to provide techniques for asynchronous task execution in one or more embodiments.

Figure 7:
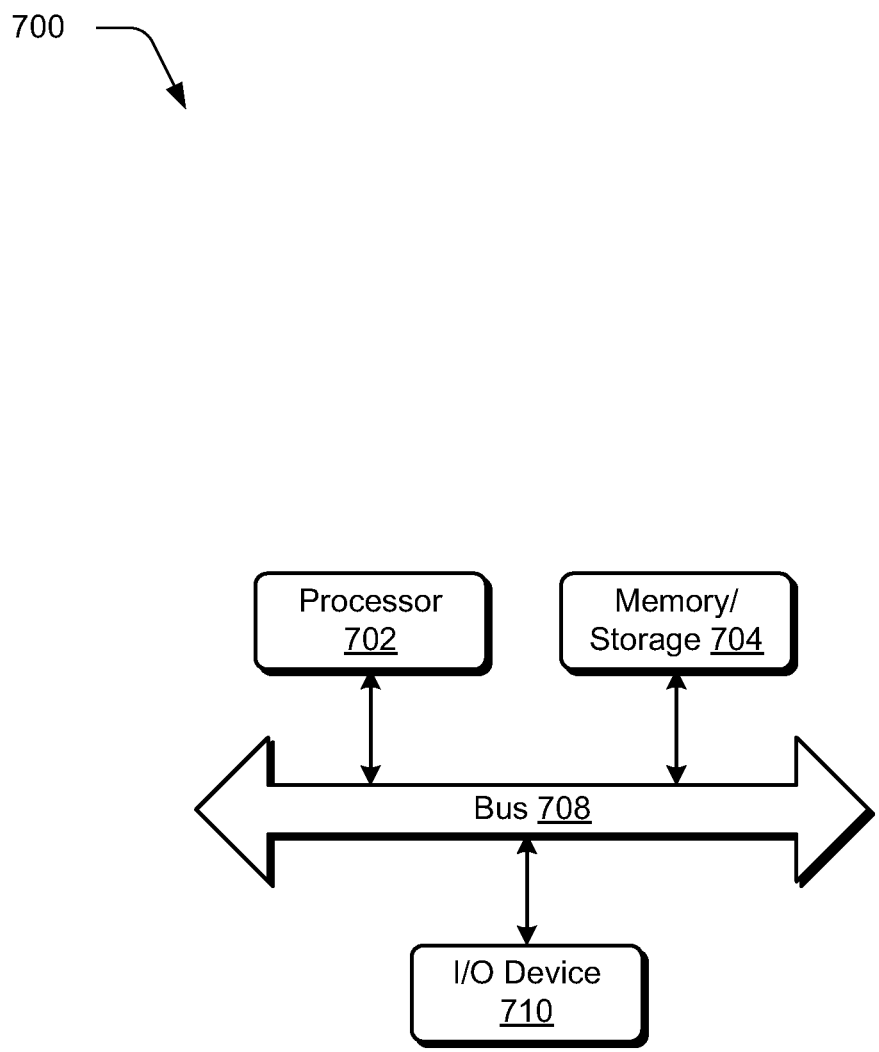
FIG. 7 is an illustration of an example device in accordance with one or more embodiments.

FIG. 7 illustrates an example computing device 700 that may implement the various embodiments described above. Computing device 700 may be, for example, a computing device 102 of FIG. 1, a server 104, or any other suitable computing device.

Computing device 700 includes one or more processors or processing units 702, one or more memory and/or storage components 704, one or more input/output (I/O) devices 706, and a bus 708 that allows the various components and devices to communicate one to another. The bus 708 represents one or more of several types of bus structures, including a memory bus or memory controller, a peripheral bus, an accelerated graphics port, and a processor or local bus using any of a variety of bus architectures. The bus 708 can include wired and/or wireless buses.

Memory/storage component 704 represents one or more computer storage media. Memory/storage component 704 may include volatile media (such as random access memory (RAM)) and/or nonvolatile media (such as read only memory (ROM), Flash memory, optical disks, magnetic disks, and so forth). Memory/storage component 704 may include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media may include a variety of available medium or media that may be accessed by a computing device. By way of example, and not limitation, computer-readable media may comprise "computer-readable storage media".

Software or program modules, including the task manager module 108, async task module 206, connection task module 208, and other program modules, may be embodied as one or more instructions stored on computer-readable storage media. Computing device 700 may be configured to implement particular functions corresponding to the software or program modules stored on computer-readable storage media. Such instructions may be executable by one or more articles of manufacture (for example, one or more computing device 700, and/or processors 702) to implement techniques for asynchronous task execution, as well as other techniques. Such techniques include, but are not limited to, the example procedures described herein. Thus, computer-readable storage media may be configured to store instructions that, when executed by one or more devices described herein, cause various techniques for asynchronous task execution.

Computer-readable storage media includes volatile and non-volatile, removable and non-removable media implemented in a method or technology suitable for storage of information such as computer readable instructions, data structures, program modules, or other data. Computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

CONCLUSION

Although the asynchronous task execution techniques have been described in language specific to structural features and/or methodological acts, it is to be understood that the appended claims are not necessarily limited to the specific features or acts described. Rather, the specific features and acts are disclosed as example forms of implementing the asynchronous task execution techniques.

What is claimed is:

1. A method, comprising:
  initiating asynchronous execution of first and second tasks, the first task is associated with a first timeout period that is shorter than a second timeout period that is associated with the second task and the first task has a priority that is less than a priority for the second task;
    responsive to expiration of the first timeout period without completing the first and second tasks, extending, without user input, the first timeout period that is associated with the first task, the first timeout period being extended until expiration or completion of the second timeout period; and
    executing the first task having the priority that is less than the priority for the second task responsive to the extending the first timeout period.

2. The method of claim 1, wherein the first or second task comprises a call to a backend service to render at least a part of a web page.

3. The method of claim 1, wherein the first task or the second task comprises a class that exposes Begin, End, and Timeout callbacks.

4. The method of claim 1, wherein the first or second tasks are asynchronous tasks with no inherent dependencies and are configured to expose Begin, End, and Timeout callbacks.

5. The method of claim 1, wherein the extending the first timeout period is performed by using a timeout extender that is associated with the first task.

6. The method of claim 5, wherein the second timeout period is used as the timeout extender for the first task.

7. The method of claim 5, wherein the timeout extender is equal to a remaining duration of time in the second timeout period and is configured to terminate responsive to expiration or completion of the second timeout period.

8. The method of claim 1, wherein the first timeout period is extended until completion of the second task.

9. A system comprising one or more modules executable by one or more processors, the one or more modules configured to: initiate asynchronous execution of first, second, and third tasks, the first task is associated with a first timeout period that is shorter than a second timeout period that is associated with the second task, the third task is associated with a third timeout period that is shorter than the second timeout, the second task has a priority that is higher than a priority for the first and third tasks;
  enable serial execution of the first and third tasks by delaying execution of the third task until the first timeout period expires or execution of the first task completes; and
  responsive to expiration of the third timeout period without completing the second and third tasks, extend, without user input, the third timeout period that is associated with the third task, in which the third timeout period is extended to equal the second timeout period and is configured to expire responsive to expiration or completion of the second timeout period.

10. The system of claim 9, wherein the one or more modules that are configured to enable serial execution comprise one or more connection modules.

11. The system of claim 9, further comprising a scheduler module configured to manage scheduling of said tasks by using dispatcher queues associated with said tasks.

12. The system of claim 9, further comprising a dispatcher module that includes multiple queues that contain additional tasks scheduled for execution, the dispatcher module is configured to load balance execution of the additional tasks by alternating between the multiple queues.

13. The system of claim 9, wherein the one or more modules are further configured to enable data resulting from the execution of the first task to be passed to the third task.

14. The system of claim 9, wherein the one or more modules are further configured to enable serial execution of the first and third tasks by delaying execution of the third task until the first timeout period and additional timeout periods of additional tasks that are dependent on the first task expire or complete.

15. One or more computer-readable memories comprising instructions stored thereon that, responsive to execution on a computing device, causes the computing device to:

initiate asynchronous execution of first and second tasks to render a web page at a client, the first and second tasks are executed in parallel, the first task is associated with a first timeout period that is shorter than a second timeout period that is associated with the second task and the first task has a priority that is less than a priority for the second task; and responsive to expiration of the first timeout period without completing both the first and second tasks, extend, without user input, the first timeout period that is associated with the first task, the first timeout period extended until completion or expiration of the second timeout period; and executing the first task having the priority that is less than the priority for the second task responsive to the extending the first timeout period.

16. The computer-readable memories of claim 15, wherein the instructions further cause the computing device to:

extend the first timeout period by using a timeout extender that is associated with the first task, wherein the timeout extender is equal to a remaining duration of time in the second timeout period; and terminate the timeout extender responsive to expiration or completion of the second timeout period.

17. The computer-readable memories of claim 15, wherein the instructions further cause the computing device to:

initiate asynchronous execution of a third task that is associated with a third timeout period that is shorter than the second timeout period, the third task has a priority that is lesser than the priority for the second task;

enable serial execution of the first and third tasks by delaying execution of the third task until the first timeout period expires or execution of the first task completes; and responsive to expiration of the third timeout period without completing the second and third tasks, extend the third timeout period.

* * * * *